United States Patent [19]

Smith

[11] Patent Number: 4,750,451

[45] Date of Patent: Jun. 14, 1988

[54] FISH REPELLING APPARATUS USING A PLURALITY OF SERIES CONNECTED PULSE GENERATORS TO PRODUCE AN OPTIMIZED ELECTRIC FIELD

[76] Inventor: David V. Smith, 14014 NE. Salmon Creek Ave., Vancouver, Wash. 98686

[21] Appl. No.: 10,587

[22] Filed: Feb. 3, 1987

[51] Int. Cl.⁴ ..................... A01K 69/00; A01K 79/00
[52] U.S. Cl. ..................................................... 119/3
[58] Field of Search .................... 119/3; 307/106, 107, 307/108

[56] References Cited

U.S. PATENT DOCUMENTS

| | | | |
|---|---|---|---|
| 1,095,170 | 4/1914 | Steinmetz | 307/107 |
| 1,974,444 | 9/1934 | Burkey | 119/3 |
| 1,997,064 | 4/1935 | Lusignan, Jr. | 307/108 |
| 2,233,045 | 2/1941 | Bonner et al. | 119/3 |
| 2,405,069 | 7/1946 | Tonks | 307/108 |

Primary Examiner—Paul J. Hirsch

[57] ABSTRACT

An electric barrier for discouraging the passage of fishes through a natural or artificial waterway, or for repelling fishes from the vicinity of an underwater structure in a waterway. A submerged electrode array is provided for electrifying at least a portion of a waterway when energized by a plurality of electric pulse generators. The outputs of the pulse generators are connected in series and each is also connected to a separate electrode of the array so that when synchronously triggered, the outputs are in phase and additive in amplitude along the electrode array. In a preferred embodiment of the invention, each pulse generator is adjustable in output amplitude so that the electric field gradients along the electrode array can be adjusted to minimize the injury to fishes repelled by the barrier.

12 Claims, 2 Drawing Sheets

FISH REPELLING APPARATUS USING A PLURALITY OF SERIES CONNECTED PULSE GENERATORS TO PRODUCE AN OPTIMIZED ELECTRIC FIELD

BACKGROUND OF THE INVENTION

The present invention relates generally to the use of electric pulses discharged between submerged electrodes for repelling fishes. For example, it relates to the use of electric fish barriers for stopping or guiding the passage of fishes through a natural or artificial waterway such as during seasonal upstream and downstream migrations. Other uses of such apparatus include the repelling of fishes away from water outlets such as drains, hydroelectric generator intakes, flumes, spillways and other dangerous areas into which they might otherwise reach or be drawn into by water flow.

One of the most desirable characteristics of a successful electric fish barrier is one where fishes entering the repelling zone experience a gradually increasing unpleasant sensation as they advance further into the electrified area. The electric zone frighten the fishes away from the barrier as efficiently as possible without causing them injury. The successful electric fish barrier described in the present specification allows fishes to learn to avoid the barrier and thus safely bypass potential danger areas.

The criterion essential for electric barriers to block upstream fish migration requires only that fishes receive enough electric current to reduce their swimming ability to a level below which they are unable to maintain progress against the stream water flow. Both alternating current (A.C.) and direct current (D.C.) can be used for upstream fish barriers. However, electric pulses derived from A.C., both single and multiphase, are considered more stressful to fishes than D.C., and therefore are more likely to cause them serious injury. Half-wave and full-wave unidirectional (D.C.) pulses are more commonly used to block fish migrations because pulsed D.C., while tetanizing, does not usually produce severe physiological effects in fishes as does A.C. and, in the case of upstream migrants, the immobilized fishes are swept clear of the electrified zone by stream water flow.

Alternatively, when electric fish barriers are operated to block downstream migration of fishes it is essential to avoid tetanus, or otherwise reduce the swimming ability of fishes, which would allow them to be swept further into the electrified area by water flow. To avoid the tetanizing effect, short duration, unidirectional pulses can be used to advantage.

In both upstream and downstream electric fish barrier designs it is important that the voltage gradient within the electrified zone gradually increase from a level below the threshold needed to repel fishes, to a level above. This type of electric fish barrier allows fishes to learn to taken an alternate path, and thus be guided around potential danger areas.

In the past such apparatus has consisted of at least one submerged active electrode from which fishes would be repelled; at least one return electrode, either submerged or otherwise earth connected, to complete the circuit; and a suitable electric power source for discharging electric current between the active and return electrodes. Although generally, in the past, a plurality of active electrodes were deployed in an attempt to adequately distribute the electric field for the purposes mentioned, they were either connected in parallel to produce a single dipole electric field, or otherwise deployed and connected to produce a plurality of separate dipole electric fields in an attempt to optimize the fish repelling function.

Electric fish barriers used in the past were characterized by repelling zones too narrowly confined to the volume of water immediately adjacent the electrodes, allowing fishes to approach to close before being adequately stimulated to produce the desired fright response. However, when the electric output used in such fish barriers was increased enough to substantially widen the repelling zone, the current density would often become harmful or lethal to fishes in the area immediately adjacent the electrodes. For example, U.S. Pat. No. 1,515,547 (Burkey); U.S. Pat. No. 2,010,601 (Loughbridge); U.S. Pat. No. 4,593,648 (Marzluf) illustrate those structural features and limitations which characterize electric fish barriers used in the past.

SUMMARY OF THE INVENTION

The present invention provides an improved method and apparatus for discouraging the passage of fishes through a natural or artificial waterway or to repel fishes away from specific underwater structures. To overcome the serious limitations of the prior art, the present invention utilizes a plurality of electric pulse generators having outputs connected in series, and each output also connected to a separate electrode of a submerged electrode array so that when simultaneously trigger, the resulting output pulses are in phase and additive in amplitude along the electrode array. In the preferred embodiment of the present invention each pulse generator is independently adjustable in output amplitude so that when serially connected to the electrode array, they can provide a graduated electric field for repelling or otherwise guiding fish migrations; with an minimum of injury.

The use of graduated electric fields as described in the preferred embodiment of the present invention overcomes the problems experienced with the electric fish barriers used in the past which were characterized by excessive voltage drop immediately adjacent the electrodes, (capable of injuring or even killing fishes), while providing a voltage gradient inadequate for repelling fishes in a relatively wider zone centered midway between the electrodes.

In summary, the present invention provides an improved electric fish barrier having an electrified zone in which the field strength can be gradually increased to the threshold for repelling fishes, while at the same time avoiding the generation of harmful or lethal zones immediately adjacent the electrodes.

DESCRIPTION OF THE PREFERRED EMBODIMENT

Figure 1:
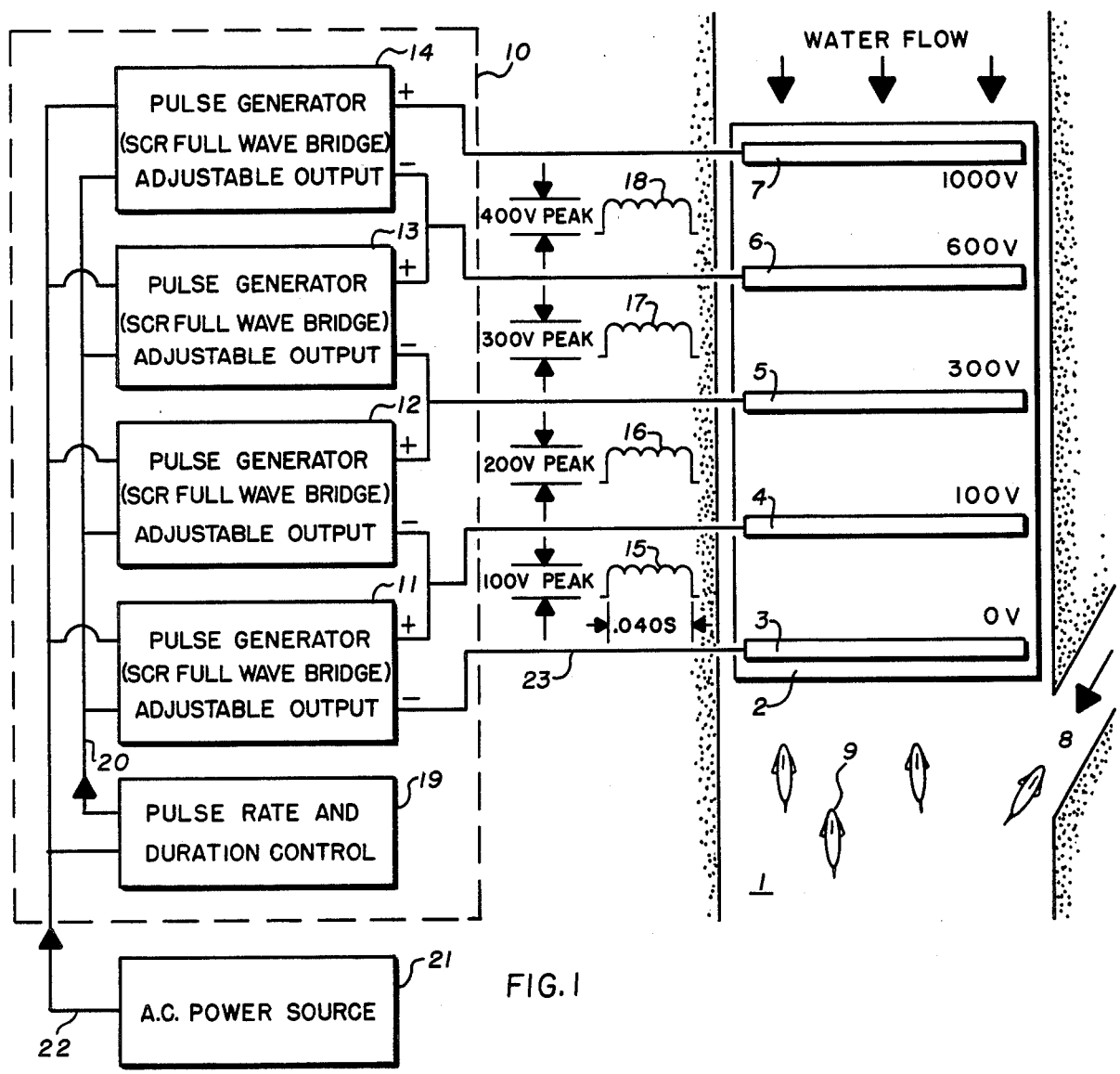
FIG. 1 shows pictorially, and in block diagram form, an electric barrier with serially connected electrodes and pulse generators suitable for discouraging the upstream passage of fishes in a natural or artificial waterway according to the present invention.

In FIG. 1, a natural or artificial waterway 1 is shown wherein fishes 9 are attempting to move upstream through a confined area in which are deployed, on the stream bottom, an artificial electrically insulating substrate 2 and five evenly spaced electrode members 3 to 7. Four unidirectional pulse generators 11 to 14 are shown having outputs connected on series and to the five submerged electrode members 3 to 7. Each of the pulse generators 11 to 14, are connected to the array through interconnecting leads, such as interconnecting lead 23 connecting pulse generator 11 to electrode 3. The pulse rate and duration control 19 is connected to each of the unidirectional pulse generators 11 to 14 so that they are triggered simultaneously. The corresponding output pulses 15 to 18 are in phase and substantially additive in amplitude along the electrode array. In this preferred embodiment, pulse generators 11 to 14 have adjustable outputs which allows individual voltage levels to be employed between respective electrodes 3 to 7. The several pulse generators 11 to 14 and the pulse rate and duration control 19 are preferably combined into a common housing 10. Fishes 9 are discourages from moving upstream through the electric barrier and are shown aggregated downstream from the barrier or moving into alternative channels such as the alternative channel 8.

In greater detail, FIG. 1 shows a natural or artificial waterway 1 in which submerged electrodes 3 to 7 have been placed to electrify a selected portion of the waterway to discourage the passage of fishes, for example during upstream migrations. A plurality of unidirectional pulse generators are shown powered by an A.C. power source 21 through the distribution leads 22. Although not shown schematically, each pulse generator includes an isolation transformer, a full-wave bridge rectifier, a trigger circuit to control output pulse rate and duration, and a phase control circuit to set output pulse amplitude. Silicon controlled rectifiers (S.C.R.s) comprise two arms of each full wave bridge rectifier to block the output except when triggers by the pulse rate and duration control 19 through the connecting lead 20. When the S.C.R.s are turned on by the pulse rate and duration control 19, unidirectional pulses are generated by each pulse generator simultaneously so that the rectified outputs, such as the outputs 15 to 18, are in phase end, because they are connected in series and to the submerged electrodes, the output peak voltages are additive along the electrode array as shown in FIG. 1. As an example of a suitable output pulse, five consecutive full-wave rectified cycles are shown for each pulse so that the pulse duration is about 0.04 second. For example, a repetition rate of two or more such pulses per second has been effective for repelling fishes without injury when a peak voltage of at least 100 volts or more from each pulse generator was applied to electrode pairs spaced at one meter.

Figure 2:
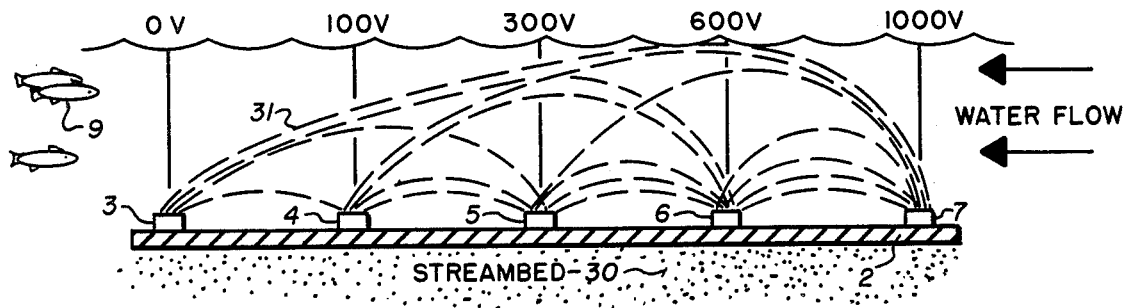
FIG. 2 shows graphically the electric field patterns generated along the serially connected electrodes of the array when they are energized in phase by the series connected outputs of the unidirectional pulse generators according to the present invention, shown in FIG. 1.

FIG. 2 shows pictorially the graduated electric field pattern 31 generated along the array of submerged electrodes in the waterway 1 when the serially connected electrodes 3 to 7 are energized simultaneously such as shown in FIG. 1. FIG. 2 further shows incrementally increasing peak output voltages 15 to 18 of the pulse generators 11 to 14 shown in FIG. 1, to provide the graduated stimulus for fishes attempting to migrate upstream through the barrier. For example, in FIG. 1 the peak output of pulse generator 11 is set at 100 volts; pulse generator 12 at 200 volts; pulse generator 13 at 300 volts; and pulse generator 14 at 400 volts to provide a total peak voltage of 1000 volts across the array when all pulse generators are simultaneously discharged in phase according to the present invention. In this way, fishes moving upstream will receive increasingly stronger repelling stimulus as they attempt to traverse the barrier. Reversing the serial connections between pulse generators and electrodes can modify the barrier to similarly accommodate downstream migrations.

In FIG. 2, the insulating substrate 2 is included in one of the preferred embodiments to substantially confine, and thereby increase, the electric current flow (current density) through the water path and reduce wasted current flow through the stream bed 30.

Figure 3:
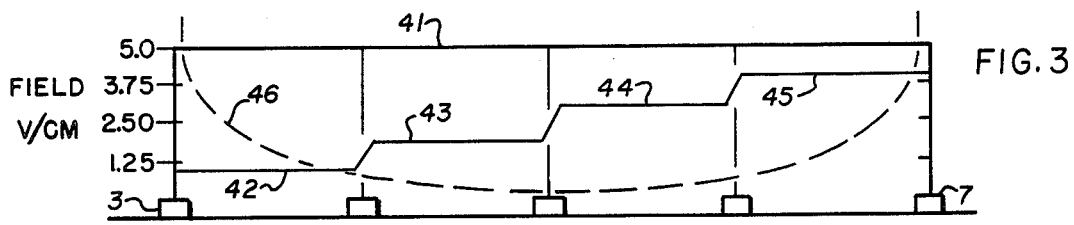
FIG. 3 shows graphically the distributed electric field strength along the serially connected electrode array for discouraging the upstream passage of fishes in a natural or artificial waterway, as shown in FIG. 1.

FIG. 3 is a diagram 41 showing the relative field strength between the submerged electrodes 3 to 7 positioned along waterway 1. For example, the graduated field strength 42 to 45 occurs between submerged electrodes 3 to 7 as shown in FIGS. 1 and 2, when they are energized by the electric pulse generators 11 to 14, according to the present invention. The graduated field strength 42 to 45 along the array between electrodes 3 to 7, gradually increases from a level below the threshold needed to repel fishes to a level above.

In FIG. 3 the hypothetical field strength pattern 46 is typical of electric fish barrier of the prior art where, for example, to electrify the same area of a stream bed, only electrodes 3 and 7 would be energized with 1000 volts, with the result that for most of the distance between the electrodes 3 and 7 the field strength 46 would be below the threshold needed to repel fishes, and fishes would be repelled only within narrow zones immediately adjacent electrodes 3 and 7. In this hypothetical dipole electric fish barrier, the voltage between electrodes 3 and 7 is shown greatly increased over customary levels in an attempt to broaden the zones in which fishes are repelled. In this case, however, the zone immediately adjacent electrodes 3 and 7 then become lethal or harmful to fishes attempting to pass this hypothetical electric barrier, representative of the prior art.

Figure 4:
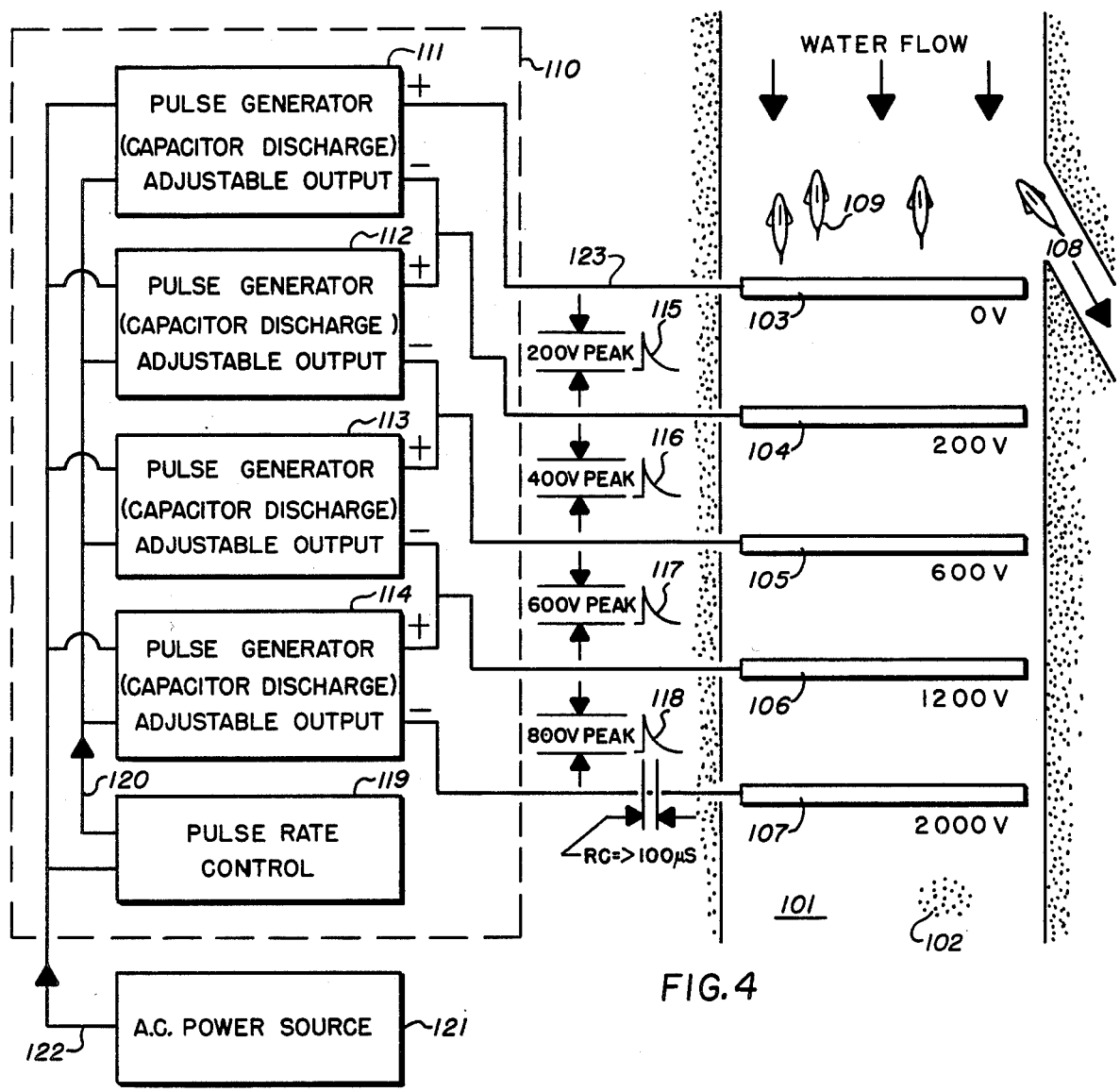
FIG. 4 shows pictorially and in block diagram form an electric barrier with serially connected electrodes and pulse generators suitable for discouraging the downstream passage of fishes in a natural or artificial waterway, according to the present invention.

In FIG. 4, a natural or artificial waterway 101 is shown wherein fishes 109 are attempting to move downstream through a confined area in which are deployed on the stream bottom 102, five evenly spaced electrode members 103 to 107. Four unidirectional pulse generators 111 to 114 are shown having outputs connected in series and to the five submerged electrode members 103 to 107. Each of the pulse generators 111 to 114, are connected to the array through interconnecting leads, such as interconnecting lead 123, connecting pulse generator 111 to electrode 103. The pulse rate control 119 is connected to each of the unidirectional pulse generators 111 to 114 through the trigger distribution leads 120 so that the pulse generators are triggered simultaneously and the corresponding output pulses 115 to 118 are in phase and substantially additive in amplitude along the electrode array. In this preferred embodiment, pulse generators 111 to 114 have adjustable outputs which allows individual voltage levels to be employed between respective electrodes 103 to 107. The plurality of electric pulse generators 111 to 114 are shown powered by A.C. power source 121 through the power distribution leads 122.

In FIG. 4, the pulse generators 111 to 114 are conventional capacitor discharge circuits wherein capacitor banks are charged to a substantially high D.C. voltage and, when triggered, are discharged between the connected electrodes by means of suitable switching devices such as silicon controlled rectifiers. The pulse duration depends on the size of the capacitor bank (C), and the electrical resistance between the electrode pairs (R), expressed as an RC time constant (RC=Resistance, in Ohms, multiplied by Capacitance, in Farads). In the electric fish barrier shown in FIG. 4, the resistance (R) between electrode pairs 103 through 107 depends on the water conductivity, electrode length, electrode spacing, cross-sectional surface areas of the electrodes, and the conductivity of the stream bottom. In such operation, the capacitance is selected to provide at least the minimum required RC pulse length of about 100 microseconds.

Figure 5:
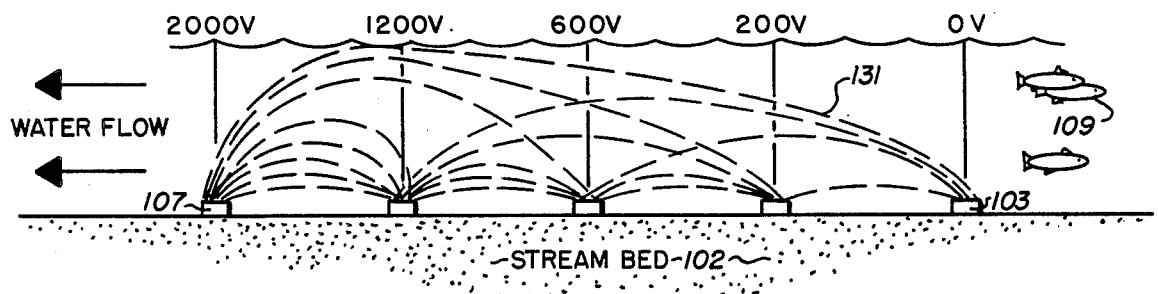
FIG. 5 shows shows graphically the electric field patterns generated along the serially connected electrodes of the array when they are energized in phase by the series connected outputs of the unidirectional pulse generators according to the present invention, as shown in FIG. 4.

Although not shown schematically, in FIG. 4, each pulse generator includes an adjustable D.C. power supply, capable of charging a capacitor bank to a substantially high D.C. voltage, and a trigger circuit consisting of control silicon controlled rectifiers (S.C.R.s), which block the output except when triggers by the pulse rate control 119 through the connecting leads 120. When the S.C.R.s are turned on, the capacitor banks are discharged simultaneously so that the pulse generator outputs, such as the outputs 115 to 118, are in phase and, because they are connected in series and to the submerged electrodes, the output peak voltages are additive along the electrode array as shown in FIGS. 4 and 5. As an example of a suitable output pulse, an RC pulse duration of about 100 microseconds is shown in FIG. 4. For example, a repetition rate of two or more such pulses per second has been effective for repelling fishes, without injury, when a peak voltage of at least 100 volts or more from each pulse generator was applied to electrodes spaced at one meter. The several pulse generators 111 to 114 and the pulse rate control 119 are preferably combined into a common housing 110. Fishes 109, shown in FIG. 4, facing into the water flow, are discouraged from moving downstream through the electric barrier and are shown aggregated upstream from the barrier, or moving into alternative channels such as the alternative channel 108.

FIG. 5 shows pictorially the electric field pattern 131 generated along the serially connected array of submerged electrodes in the waterway 101 when the electrodes are energized simultaneously such as shown in FIG. 4. FIG. 5 further shows the combined effect of the incrementally increasing pulse output voltages 115 to 118 of the pulse generators 111 to 114 shown in FIG. 4 to provide the graduated stimulus for fishes attempting to migrate downstream through the barrier. In FIG. 4, for example, the peak output of pulse generator 111 is set at 200 volts; pulse generator 112 at 400 volts; pulse generator 13 at 600 volts; and pulse generator 14 at 800 volts to provide a total peak voltage of 2000 volts across the array when all pulse generators are simultaneously discharged in phase according to the present invention. In this way, fishes moving downstream will receive increasingly stronger repelling stimulus as they attempt to traverse the barrier. Reversing the serial connections between pulse generators and electrodes can modify the barrier to similarly accommodate upstream migrations.

Figure 6:
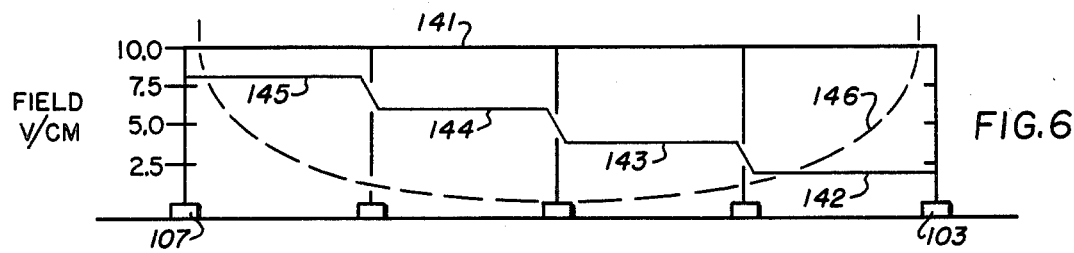
FIG. 6 shows graphically the distributed electric field strength along the serially connected electrode array, shown in FIG. 4, for discouraging downstream passage of fishes in a natural or artificial waterway, when energized according to the present invention.

FIG. 6 is a diagram 141 showing the relative field strength between the submerged electrodes 103 to 107 positioned along waterway 101. For example, the graduated field strength 142 to 145 occurs between submerged electrodes 103 to 107 as shown in FIGS. 4 and 5, when they are energized by the electric pulse generators 111 to 114, according to the present invention. The graduated field strength 142 to 145 along the array between electrodes 103 to 107, gradually increases from a level below the threshold needed to repel fishes to a level above.

In FIG. 6 the hypothetical field strength pattern 146 is typical of fish barriers of the prior art where, for example, to electrify the same area of a stream bed, only electrodes 103 and 107 would be energized with 2000 volts, with the result that for most of the distance between electrodes 103 and 107, the field strength 146 would be below the threshold needed to repel fishes, and fishes would be repelled only within narrow zones immediately adjacent the electrodes 103 and 107. In this hypothetical dipole electric fish barrier, the voltage between electrodes 103 and 107 is shown greatly increased over customary levels in an attempt to broaden the zones in which fishes are repelled. In this case, however, the zones immediately adjacent the electrodes 103 and 107 then become harmful or lethal to fishes attempting to pass this hypothetical electric barrier representative of the prior art.

In one preferred mode of operation shown to be particularly effective, capacitor discharge pulses have been used to energize a submerged electrode array as shown in FIG. 4, with pulse durations of 100 to 500 microseconds. Although pulse repetition rates from 1 to 10 pulses per second have been effective for repelling fishes according to the present invention, either lower or higher rates can also be used. Although certain electric pulse characteristics are suggested in the examples shown, a wide variety of electric pulses could be used for this purpose provided only that they produce an electric stimulus above the threshold sensed by at least some fishes to produce the repelling effect.

The optimum peak voltage of the electric pulses and the optimum electrode spacing depend on the water conductivity, depth, and conductivity of the stream bottom, and also on the approximate size of the fishes to be repelled. For example, substantially smaller fishes require a somewhat higher peak voltage and/or a narrow electrode spacing. A one meter electrode spacing has been found satisfactory in some applications involving migrating salmon in which progressively increasing peak pulse voltages of 100 to 800 were generated by unidirectional pulse generators. Any number of electric pulse generators with corresponding electrode connected in series can be used for an electric fish barrier, but the most practical systems range from 2 to 6 pulse generators with outputs connected in series and to corresponding electrodes.

The submerged electrodes in the array can be made of any suitable conductive material, and stainless steel has been particularly satisfactory. The electrodes can be configures as strips, tubing, flexible braid, or other elongated conductive material. In a preferred mode of operation, an artificial electrically insulating substrate is used to cover a portion of the bottom of the waterway beneath the electrode array. For example, a sheet of plasticized fabric can provide an insulating substrate, and a flexible braid of stainless steel wires can serve as the electrode material. A parallel array of such electrodes spaced and attached to the top surface of the artificial substrate has been found to be effective. Alternatively, other artificial insulating substrate material such as wood, cement, fiberglass sheets or other plastics can be used. As a further alternative, the artificial insulating substrate can be omitted altogether as shown in FIG. 4 if the stream bottom is not highly conductive.

ALTERNATIVE OPERATION OF THE INVENTION

Although the electric fish barriers according to the present invention as shown in FIGS. 1 and 4, utilize unidirectional pulse generators to produce the safest type of pulses for blocking the migration of desirable fish species, it is sometimes preferable to ensure absolute blockage of all fishes or other aquatic animals attempting to traverse the barrier, without regard to fish damage or mortalities. In this case, the fish barrier electrodes 3 to 7 as shown in FIG. 1, or electrodes 113 to 117 in FIG. 4, can be energized with alternating current (A.C.). Each pulse generator 11 to 14 in FIG. 1, or pulse generators 111 to 114 shown in FIG. 4, are replaced with four corresponding A.C. transformers, or with a larger single transformer provided with four secondary windings or taps. The four corresponding A.C. transformer secondary windings are connected in series and to the five submerged electrode members 3 to 7 in FIG. 1, or 113 to 117 in FIG. 4. The A.C. transformer output voltages can be continuous or can be pulsed by means of S.C.R.s or suitable switching circuits. Output voltages from each transformer can be variable, for a graduated electric field, or equal, for a constant field strength across the fish barrier array.

For purposes of illustration, all of the FIGS. 1 through 6 show uniformly spaced electrodes in the electric fish barrier of the present invention. For reasons mentioned in the foregoing, it is often advantageous to provide a gradually increasing stimulus to reduce the possibility of injury to migrating fishes. Therefore, as an alternative, the spacing between the electrodes can be decreased progressively along the array to produce an increasingly stronger stimulus. For example, in FIG. 1 the spacing between electrodes 3 and 4 can be 2.0 meters; between 4 and 5, 1.5 meters; between 5 and 6, 1.0 meters; and between 6 and 7, 0.5 meter. In this way, fishes moving upstream across the barrier will receive an increasingly stronger stimulus even when pulse generators 11 to 15 are operated with outputs of equal amplitude.

While only certain preferred embodiments are shown and described herein, it is understood that many other modifications are possible and the invention is not limited to the specific structure shown, nor otherwise, except as set forth in the following claims.

What I claim is:

1. An electric fish barrier for discouraging the passage of fishes through a natural or artificial waterway comprising:
   an electrode array including a plurality of submerged electrodes spaced and arranged for electrifying at least a portion of the aforementioned waterway;
   a plurality of electric pulse generators each providing output pulses capable of repelling fishes when discharged between two or more of said electrodes;
   means for connecting the output of said pulse generators in series;
   means for connecting the outputs of said series connected pulse generators to separate electrodes of the said electrode array; and
   control means for synchronously triggering said electric pulse generators so hat said series connected output pulses are in phase and substantially additive in voltage along said electrode array.

2. Apparatus as described in claim 1 wherein:
   said electric pulse generators are further characterized as having means for adjusting the output voltage amplitude so that the component electric field gradients along the said electrode array can be individually adjusted and combined to repel fishes from the aforementioned fish barrier with a minimum amount of injury.

3. Apparatus as described in claim 1 wherein:
   each of said electric pulse generators is further characterized as comprising a capacitor bank and discharge control circuit for providing output pulses capable of repelling fishes when repetitively discharged between two or more of said submerged electrodes.

4. Apparatus as described in claim 1 wherein:
   each of said electric pulse generators is further characterized as comprising a full-wave rectifier circuit driven by an A.C. power source for providing output pulses capable of repelling fishes when discharged between two or more of said submerged electrodes; and
   said control means for synchronously triggering said electric pulse generators is further characterized as having a pulse duration control so that a selected number of successive full-wave rectified cycles can be included in each of said output pulses.

5. Apparatus as described in claim 1 wherein:
   each of said electric generators is further characterized as comprising a half-wave rectifier circuit driven by an A.C. power source for providing output pulses capable of repelling fishes when discharged between two or more of said submerged electrodes; and
   said control means for synchronously triggering said electric pulse generators is further characterized as having a pulse duration control so that a selected number of successive half-wave recified cycles can be included in each of said output pulses.

6. Apparatus as described in claim 1 wherein:
   each of said electric pulse generators is further characterized as comprising a transformer circuit driven by an A.C. power source for providing A.C. output pulses capable of repelling fishes when discharged between two or more of said submerged electrodes; and
   said control means for synchronously triggering said electric pulse generators is further characterized as having a pulse duration control so that a selected number of successive A.C. cycles can be included in each of said output pulses.

7. An electric fish barrier for discouraging the passage of fishes through a natural or artificial waterway comprising:
   an electrically insulating substrate for covering at least a portion of the bottom of the aforementioned waterway;
   an electrode array including a plurality of submerged electrodes spaced and arranged for electrifying at least a portion of the aforementioned waterway above the said insulating substrate;
   a plurality of electric pulse generators each providing output pulses capable of repelling fishes when discharged between two or more of said submerged electrodes;
   means for connecting the outputs of said pulse generators in series;
   means for connecting the outputs of said series connected pulse generators to separate electrodes of the said electrode array; and
   means for synchronously triggering and electric pulse generators so that said series connected output pulses are in phase and substantially additive in voltage along said electrode array.

8. Apparatus as described in claim 7 wherein:
   the said electrically insulating substrate for covering at least a portion of the bottom of the aforementioned waterway comprises a wooden decking.

9. Apparatus as described in claim 7 wherein:
   the said electrically insulating substrate for covering at least a portion of the bottom of the aforementioned waterway comprises a flexible plastic sheet.

10. Apparatus as described in claim 7 wherein:
    the said electrically insulating substrate for covering at least a portion of the bottom of the aforementioned waterway comprises a sheet of fiberglass reinforced plastic.

11. Apparatus as described in claim 7 wherein:
    the said electrically insulating substrate for covering at least a portion of the bottom of the aforementioned waterway comprises a sheet of rubberized fabric.

12. The method of discouraging fishes from passing through a natural or artificial water way or for repelling fishes from the vicinity of an underwater structure in a waterway which comprises:
    providing an electrode array including a plurality of submerged electrodes spaced and arranged for electrifying at least a portion of the aforementioned waterway;
    providing a plurality of electric pulse generators each having output pulses capable of repelling nearby fishes when discharged between one or more of said submerged electrodes;
    connecting the outputs of said pulse generators in series;
    connecting the outputs of said pulse generators to separate electrodes of the said electrode array; and
    synchronously triggering said electric pulse generators so that said series connected output pulses are in phase and mutually additive in amplitude along said electrode array.

* * * * *